US009804642B2

(12) United States Patent
Chen et al.

(10) Patent No.: US 9,804,642 B2
(45) Date of Patent: Oct. 31, 2017

(54) SYSTEMS AND METHODS FOR MOUNTING AND DISMOUNTING COMPUTING COMPONENTS

(71) Applicant: Quanta Computer Inc., Taoyuan (TW)

(72) Inventors: Chao-Jung Chen, Taoyuan (TW); Chi-Fu Chen, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 0 days.

(21) Appl. No.: 14/789,033

(22) Filed: Jul. 1, 2015

(65) Prior Publication Data
US 2016/0179131 A1    Jun. 23, 2016

Related U.S. Application Data

(60) Provisional application No. 62/093,644, filed on Dec. 18, 2014.

(51) Int. Cl.
*G06F 1/18*          (2006.01)

(52) U.S. Cl.
CPC .................................. *G06F 1/187* (2013.01)

(58) Field of Classification Search
CPC ........................................................ G06F 1/16
See application file for complete search history.

(56) References Cited

U.S. PATENT DOCUMENTS

| 4,426,122 | A  | * | 1/1984  | Lainez ................. | A62B 18/082 361/679.55 |
| 6,171,120 | B1 | * | 1/2001  | Bolich ............ | H01R 13/62933 361/679.4 |
| 6,490,153 | B1 | * | 12/2002 | Casebolt ................. | G06F 1/184 361/679.33 |
| 6,774,808 | B1 | * | 8/2004  | Hibbs ..................... | G06F 1/184 340/686.4 |
| 7,408,788 | B2 | * | 8/2008  | Rubenstein .......... | H05K 7/1409 361/754 |
| 7,417,866 | B1 | * | 8/2008  | Beseth ................ | H05K 7/1409 361/728 |

(Continued)

FOREIGN PATENT DOCUMENTS

TW          476023 B       2/2002
TW       201318531 A       5/2013

OTHER PUBLICATIONS

Taiwanese Office Action for Application No. 104131617, dated Aug. 8, 2017, w/ Second Office Action Summary.

*Primary Examiner* — Lisa Lea Edmonds
(74) *Attorney, Agent, or Firm* — Nixon Peabody LLP; Eduardo J. Quinones; Zhou Lu

(57) ABSTRACT

Various embodiments of the present technology provide systems and methods for mounting and dismounting a computing component (e.g., a HDD) of a server system. The server system contains one or more drawers, each of which can host a plurality of computing components. A computing component can have a side surface attached to a lever via a hinge. When the computing component is placed into a designated location of a drawer, pressing a first end of the lever in one direction can cause a second end of the lever to interact with at least one portion of the drawer and further cause the computing component to move into a close position or out of the close position.

15 Claims, 9 Drawing Sheets

(56) References Cited

U.S. PATENT DOCUMENTS

| | | | | |
|---|---|---|---|---|
| 8,369,080 B2* | 2/2013 | Huang | ................... | G06F 1/187 |
| | | | | 361/679.37 |
| 2008/0013288 A1* | 1/2008 | Karstens | .............. | H05K 7/1409 |
| | | | | 361/726 |
| 2010/0134987 A1* | 6/2010 | Furholzer | .............. | H02B 1/052 |
| | | | | 361/747 |
| 2013/0099640 A1* | 4/2013 | Hu | ....................... | G11B 33/124 |
| | | | | 312/223.2 |
| 2014/0233182 A1* | 8/2014 | Demange | ............. | H05K 7/1487 |
| | | | | 361/679.58 |
| 2015/0327414 A1* | 11/2015 | Jau | ................... | H05K 13/0084 |
| | | | | 206/701 |
| 2016/0042768 A1* | 2/2016 | Yang | ................... | G11B 33/128 |
| | | | | 403/322.4 |

* cited by examiner

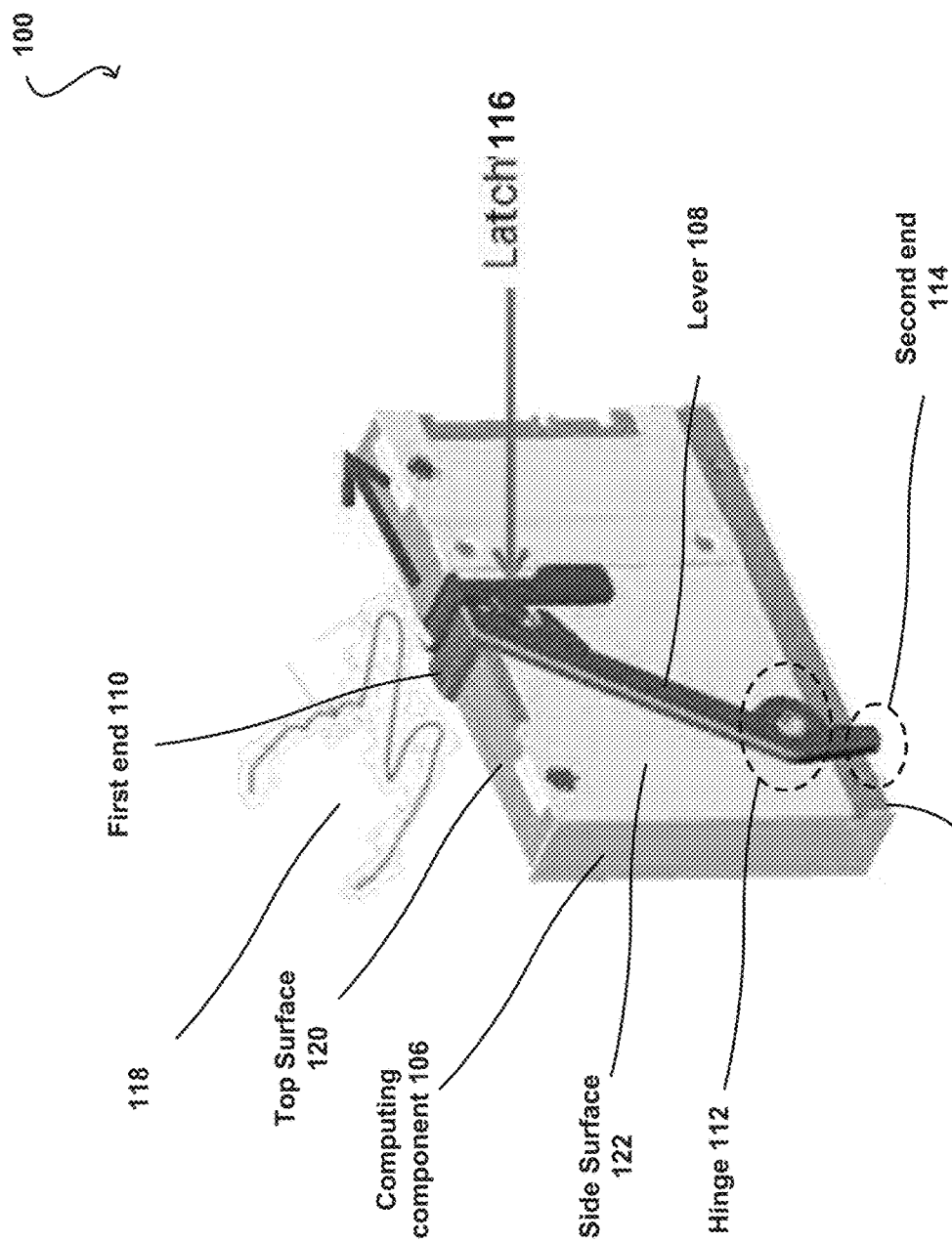

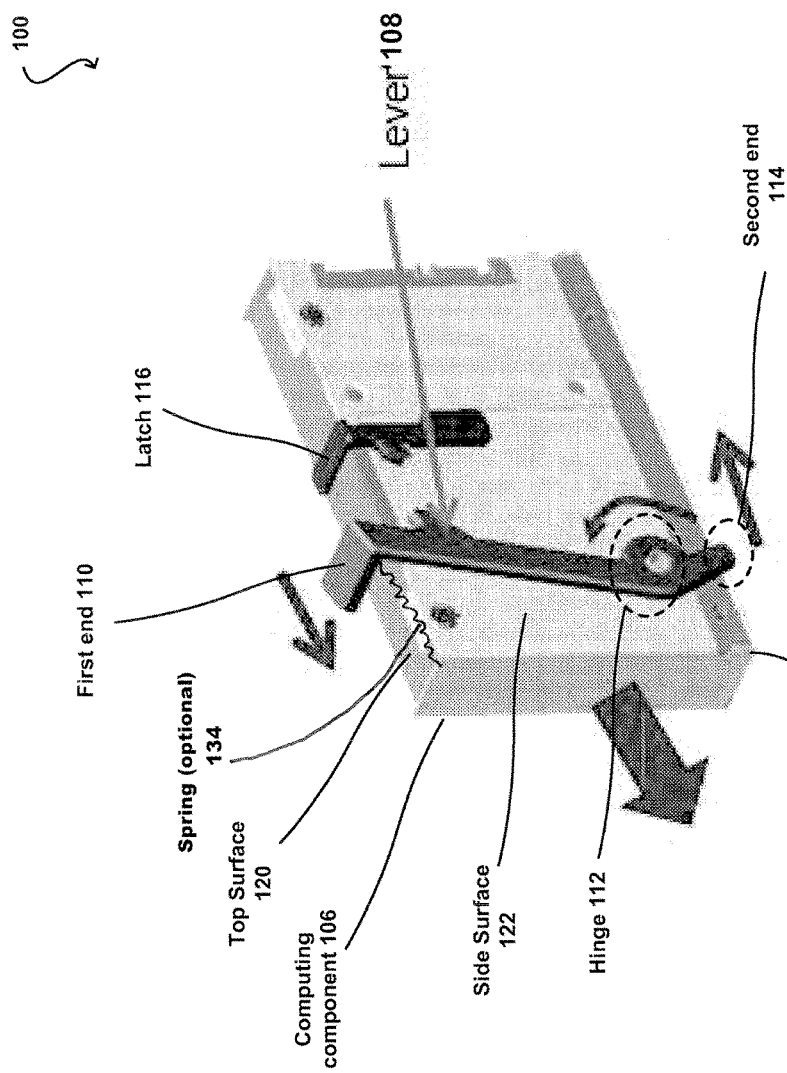

SYSTEMS AND METHODS FOR MOUNTING AND DISMOUNTING COMPUTING COMPONENTS

RELATED APPLICATIONS

This application claims priority of U.S. Provisional Application No. 62/093,644, filed on Dec. 18, 2014, and entitled "HDD Release Mechanism", the contents of which are hereby incorporated herein by reference in its entirety for all purposes.

TECHNICAL FIELD

The present technology relates generally to systems and methods for mounting and dismounting computing components.

BACKGROUND

Modern server farms or datacenters typically employ a large number of servers to handle processing needs for a variety of application services. Each server employs a large number of computing components (e.g., hard disk drives HDDs). Components of a server may need to be repaired or replaced by a technician or user.

A traditional component (e.g., HDD) of a server system may be fixed on a motherboard of the server system using screws or may require a carrier to host the component. Replacing such traditional components can cause substantial server downtime or be too costly. Thus, there is a need to provide a system and method for mounting and dismounting a component of a server system such that the component can be easily and quickly replaced with a minimum cost.

SUMMARY

Systems and methods in accordance with various embodiments of the present technology provide a solution to the above-mentioned problems by providing a mechanism for mounting and dismounting a computing component (e.g., a HDD) of a server system. More specifically, various embodiments of the present technology provide a lever for a computing component of a server system such that the computing component can be easily mounted into and dismounted from the server system. The lever includes a hinge that is attached to the computing component, and having a first end and a second end. When the computing component is placed into a designated location of the server system, pressing the first end of the lever in one direction can cause the second end of the lever to interact with at least one portion of the server system and further cause the computing component to slide into a close position or out of the close position. In some implementations, the first end of the lever can be locked by a latch when the computing component is under the close position. The latch has to be released before the first end of the lever and the computing component can be moved out of the close position. In some embodiments, the computing component is connected to the server system when the computing component is under the close position, or is disconnected from the server system when the computing component is not under the close position.

In some embodiments, a lever can be attached to a computing component via a hinge to a side surface of the computing component and extend such that a first end extends above a top surface of the computing component and a second end extends below a bottom surface of the computing component. Manipulation with the first end of the computing component can cause the lever to interact via at least one portion of the server system and cause the computing component to connect to or disconnect from the server system.

In some embodiments, a server system has one or more drawers, each of which can host a plurality of computing components. Each drawer includes at least one component board (e.g., a motherboard or a backplane board), and a connector that can be connected to the server system. When a computing component is placed into a designated location of a drawer, a movement of a first end of a lever of the computing device can cause a second end of the lever to interact with at least one portion of the drawer and further cause the computing component to move into a close position or out of the close position. When the computing component is under the close position, the computing component is connected to a component board of the drawer. In some implementations, the drawer can have a handle that allows an operator or a machine to pull out the drawer from a server system or insert the drawer back into the server system.

In some embodiments, each drawer of a server system includes a supporting surface. The supporting surface includes a plurality of designated locations. Each of the plurality of designated locations may have two or more slots that receive pins of a computing component. For example, a lever attached to the computing component may protrude into a slot at a designated location. Manipulation with a first end of the lever may cause the lever to interact via a second end of the lever with the slot to connect the computing component to the server system or disconnect the computing component from the server system.

In some embodiments, each drawer of a server system can have at least one row to host a plurality of computing components. Each of the at least one row includes a component board, and two or more designated locations to host the plurality of computing components. In some embodiments, each of the at least one row can have a top cover configured to improve performance of the server system. For example, a top cover may help to improve thermal stability of the server system.

In some embodiments, a lever of a computing component can be attached to a spring. When a first end of the lever is released by a latch, a spring force can cause the first end of the lever to bounce to an open position such that the first end can be easily accessed. In some embodiments, a first end of a lever of a computing component has a minimum threshold width to enable an operator or a machine to apply a force to the first end of the lever. In some implementations, the first end of the lever is configured to enable an operator or a machine to mount or dismount the computing component into or from a drawer, or carry the computing component.

In some embodiments, a computing component of a server system can include one or more guide pins. The one or more guide pins can be configured to facilitate aligning or placing the computing component into a designated location inside the server system or inside a drawer of the server system.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIGS. 1C and 1D illustrate schematic block diagrams of an exemplary computing component containing a lever with a hinge in accordance with implementations of the present technology;

DETAILED DESCRIPTION

Various embodiments of the present technology provide systems and methods for mounting and dismounting a computing component (e.g., a HDD) of a server system. The server system contains one or more drawers, each of which can host a plurality of computing components. A computing component can have a side surface attached to a lever via a hinge. When the computing component is placed into a designated location of a drawer, pressing a first end of the lever in one direction can cause a second end of the lever to interact with at least one portion of the drawer and further cause the computing component to move into a close position or out of the close position. In some implementations, the first end of the lever can be locked by a latch when the computing component is under the close position.

Figure 1A:
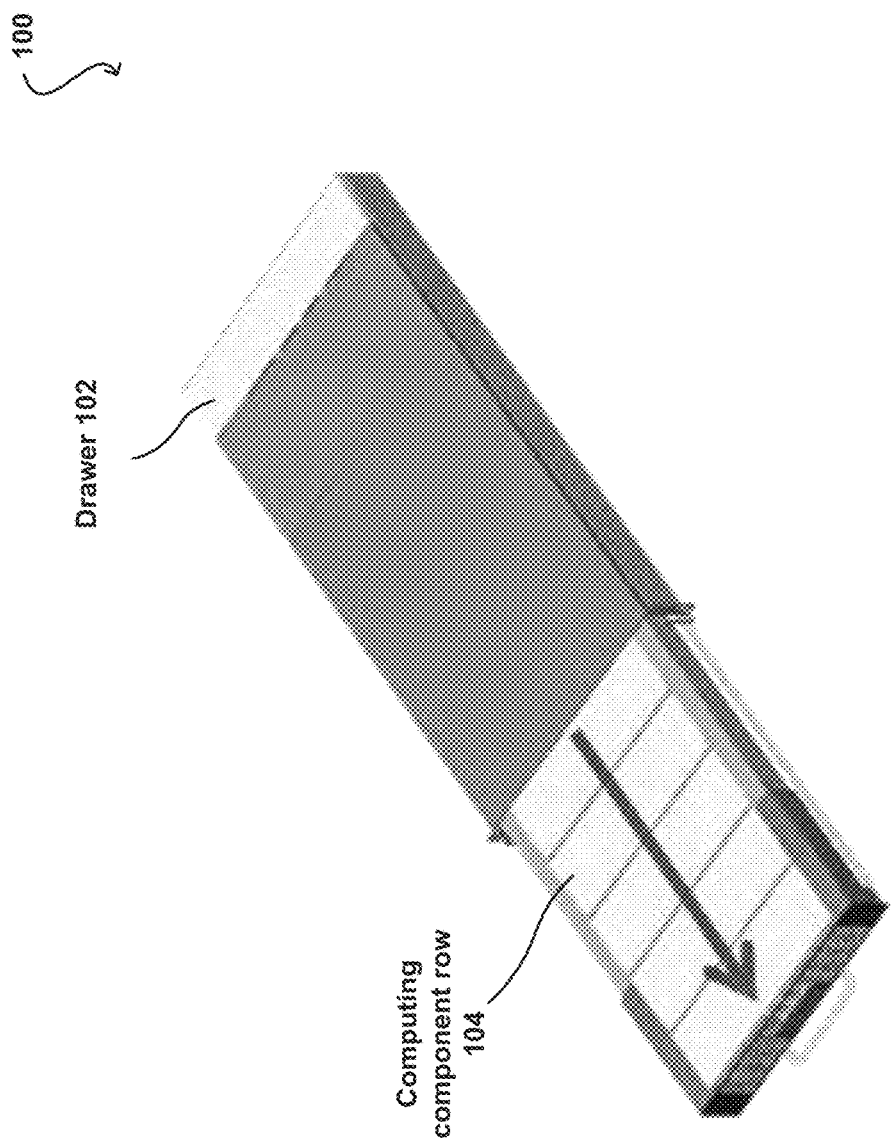
FIGS. 1A and 1B illustrate schematic block diagrams of an exemplary drawer of a server system in accordance with an implementation of the present technology.
Figure 1B:
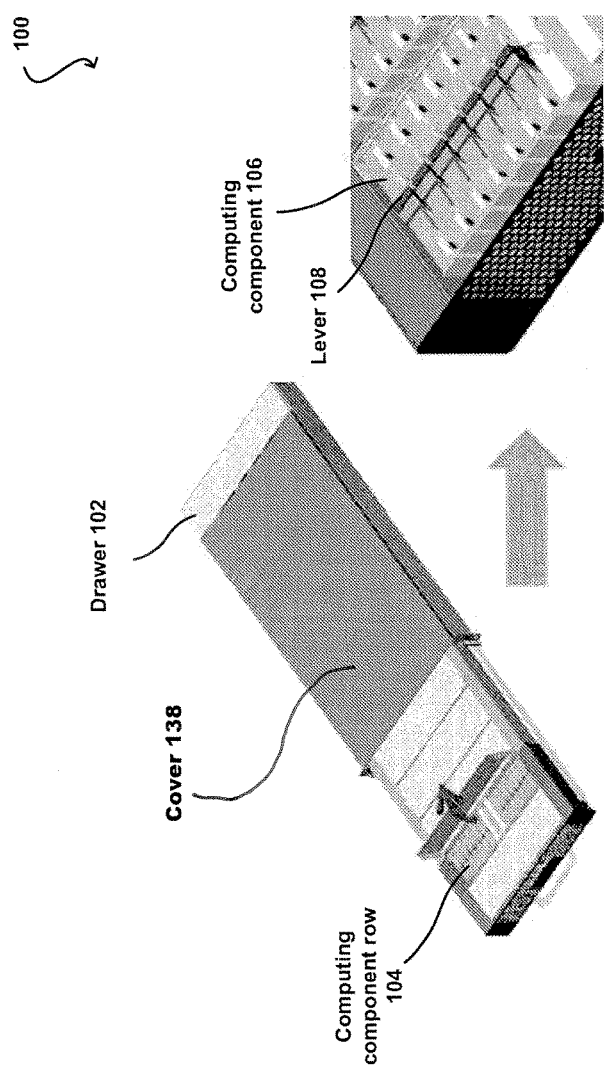

FIGS. 1A and 1B illustrate schematic block diagrams of an exemplary drawer 102 of a server system 100 in accordance with an implementation of the present technology. In this example, the server system 100 comprises one or more drawers (e.g., 102), and one or more connectors (not shown) to be connected with the drawer 102. The one or more drawers have a cover 138. Each drawer of the server system 100 includes one or more computing component rows (e.g., 104). Each of the computing component rows includes at least one component board (e.g., a motherboard, a mid-plane board, or a backplane board) and two or more designated locations to host a plurality of computing components (e.g., 106). At least one of the plurality of computing components is attached to a lever (e.g., 108).

In some implementations, the server system 100 includes one or more power supply units (PSUs) (not shown) that converts an AC power supply to the server system 100 and provides power to various component (not shown) of the server system 100, such as at least one microprocessor or CPU, cache, NB logic, PCIe slots, Memory, SB logic (optional), ISA slots, PCI slots, a controller, and/or at least one memory, a sound card, a video card, a network card, and various other components. After being powered on, the server system 100 is configured to load software application from memory, computer storage device, or an external storage device to perform various operations.

In some implementations, the main memory of the server system 100 can be coupled to the CPU via a north bridge (NB) logic. A memory control module can be used to control operations of the memory by asserting necessary control signals during memory operations. The main memory may include, but is not limited to, dynamic random access memory (DRAM), double data rate DRAM (DDR DRAM), static RAM (SRAM), or other types of suitable memory.

In some implementations, the CPU can be multi-core processors, each of which is coupled together through a CPU bus connected to the NB logic. In some implementations, the NB logic can be integrated into the CPU. The NB logic can also be connected to a plurality of peripheral component interconnect express (PCIe) ports and a south bridge (SB) logic (optional). The plurality of PCIe ports can be used for connections and buses such as PCI Express x1, USB 2.0, SMBus, SIM card, future extension for another PCIe lane, 1.5 V and 3.3 V power, and wires to diagnostics LEDs on the server's chassis.

In some implementations, the NB logic and the SB logic of the server system 100 are connected by a peripheral component interconnect (PCI) Bus. The PCI Bus can support function on the CPU in a standardized format that is independent of any of CPU's native buses. The PCI Bus can be further connected to a plurality of PCI slots (e.g., a PCI slot). Devices connect to the PCI Bus may appear to a bus controller as being connected directly to a CPU bus, assigned addresses in the CPU's address space, and synchronized to a single bus clock. PCI cards can be used in the plurality of PCI slots include, but are not limited to, network interface cards (NICs), sound cards, modems, TV tuner cards, disk controllers, video cards, small computer system interface (SCSI) adapters, and personal computer memory card international association (PCMCIA) cards.

In some optional implementations, the SB logic (optional) can couple the PCI bus to a plurality of expansion cards or slots (e.g., an ISA slot) via an expansion bus. The expansion bus can be a bus used for communications between the SB logic and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In some implementations, the NB logic is further coupled to a controller that is connected to the at least one PSU. In some implementations, the controller can be a baseboard management controller (BMC), rack management controller (RMC), a keyboard controller, or any other suitable type of system controller. The controller is configured to control operations of the one or more PSUs and/or other applicable operations. In some implementations, the controller is configured to monitor processing demands, power consumptions, and components and/or connection status of the server system 100.

FIGS. 1C and 1D illustrate schematic block diagrams of an exemplary computing component 106 containing a lever 108 with a hinge 112 in accordance with implementations of the present technology. In this example, the computing component 106 is placed on top of a designated location of the drawer 102. The drawer 102 is illustrated in FIGS. 1A and 1B. The computing component 106 includes a top surface 120, a side surface 122, and a bottom surface 124. The side surface 122 of the computing component 106 is attached the lever 108. Pressing a first end 110 of the lever 108 towards a latch 116 can cause a second end 114 of the lever 108 to move away from the latch 116 and press against at least one portion of the drawer 102 such that the computing component 106 can move forward. Further pressing the first end 110 can cause the first end 110 of the lever 108 to move forward into a close position and cause the computing component 106 to slide from an open position into a close position. Under the close position, the first end 110 of the lever 108 is locked by the latch 116 and the computing component 106 is connected with a component board (not shown) of the drawer 102.

As illustrated in FIG. 1C, a force (e.g., applied by a hand 118) applying to the latch 116 causes the first end 110 of the lever 108 to be released from the latch 116. In some embodiments, the lever 108 can be attached to a spring 134 (optional). In response to being released from the latch 116, a spring force can move the first end 110 of the lever 108 backward to a position such that the first end 110 can be easily accessed by an operator or a machine.

As illustrated in FIG. 1D, a force is applied to the first end 110 of the lever 108 in the direction away from the latch 116 and causes the second end 114 of the lever 108 move in an opposite direction towards the latch 116. The movement of the second end 114 can cause the second end 114 to press against at least one portion of the drawer 102 such that the computing component 106 moves backwards. Further applying the force to the first end 110 can move the first end 110 into the open position and cause the computing component 106 to slide from the close position into the open position. Under the open position, the computing component 106 is disconnected from the component board (not shown).

Figure 1E:
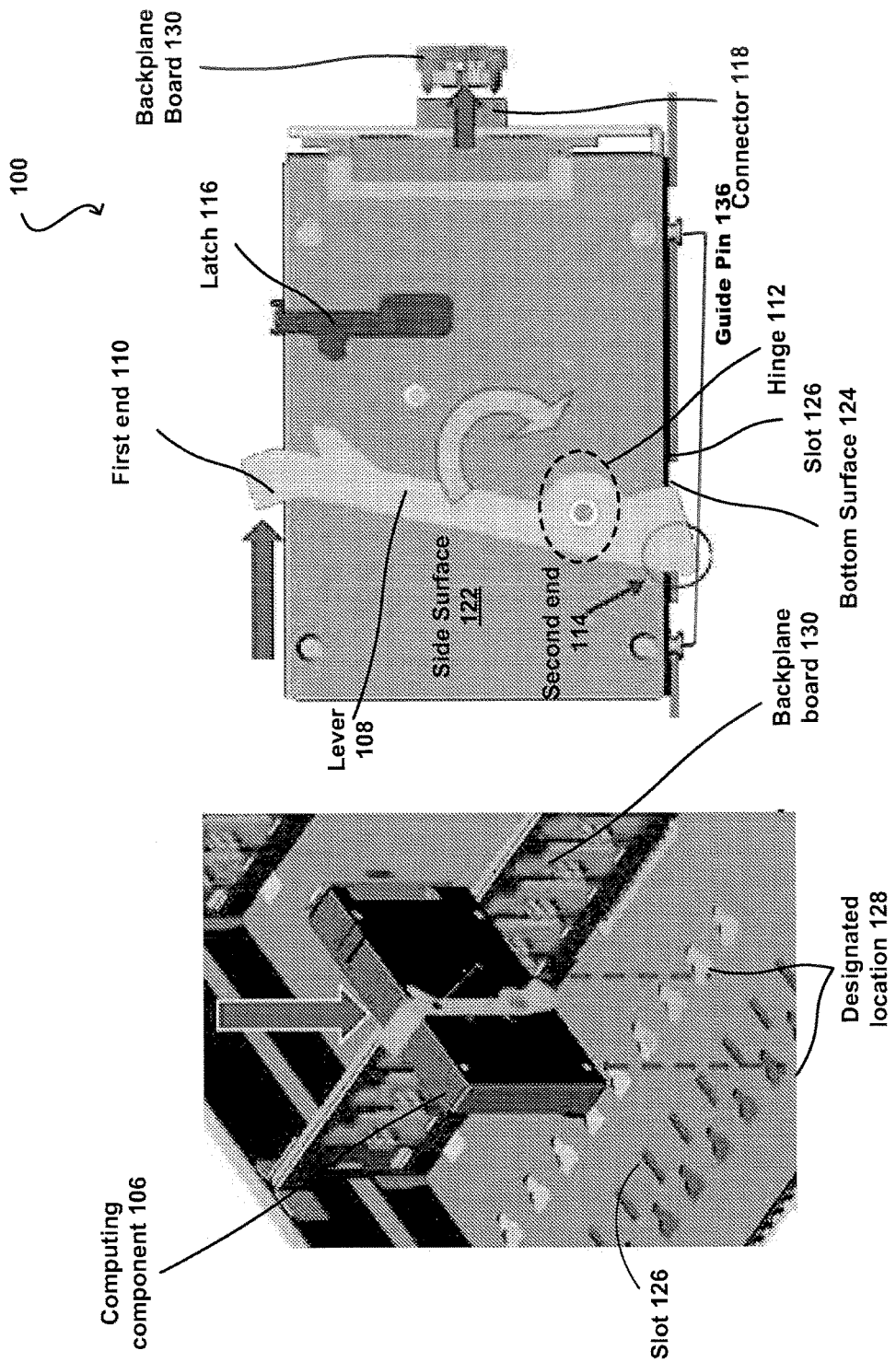
FIGS. 1E and 1F demonstrate schematic block diagrams of mounting an exemplary computing component onto a drawer of a server system in accordance with implementations of the present technology.
Figure 1F:
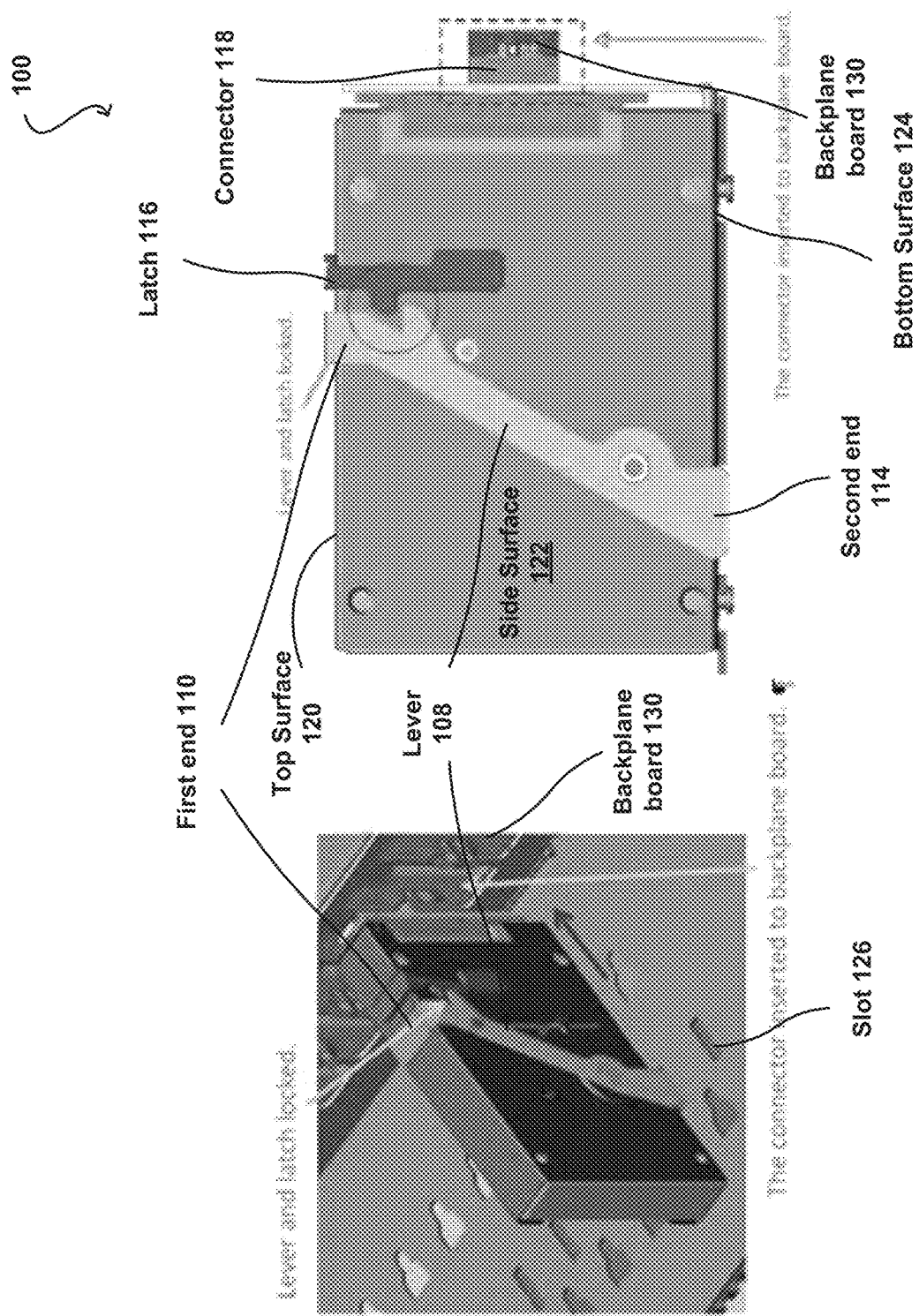

FIGS. 1E and 1F demonstrate schematic block diagrams of mounting an exemplary computing component 106 into a drawer of a server system 100 in accordance with implementations of the present technology. In this example, the drawer of the server system 100 has a supporting surface and includes two or more computing component rows. Each computing component row includes a backplane board (e.g., 130) and two or more designated locations (e.g., 128) to host a plurality of computing components (e.g., 106). Each of the two or more designated locations has two or more slots (e.g., 126) that receive pins of a computing component. In some embodiments, the computing component 106 includes one or more guide pins 136 configured to facilitate aligning or placing the computing component 106 into a designated location 128.

As illustrated in FIG. 1E, the second end 114 of the lever 108 protrudes into a slot at the designated location 128. Pressing the first end 110 of the lever 108 forward towards the latch 116 causes the second end 114 of the lever 108 to interact with at least one portion of the slot and further cause the computing component 106 to move forward towards the backplane board 130. Further pressing the first end 110 of the lever 126 into a close position can cause a connector 118 of the computing component 106 to be connected with the backplane board 130 and cause the first end 110 to be locked by the latch 116.

FIG. 1F further illustrates a close position of the first end 110 of the lever 108 and the computing component 106. Under the close position, the first end 110 of the lever 108 is locked by the latch 116 and the connector 118 is connected with the backplane board 130 of the drawer of the server system 100.

Although only certain components are shown within the server system 100 in FIGS. 1A-1F, various types of electronic or computing components that are capable of processing or storing data, or receiving or transmitting signals can also be included in the server system 100. Further, the electronic or computing components in the server system 100 can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for in the server system 100, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the server system 100 illustrated in FIGS. 1A-1H are used for purposes of explanation. Therefore, a network system can be implemented with many variations, as appropriate, yet still provide a configuration of network platform in accordance with various embodiments of the present technology.

In exemplary configurations of FIGS. 1A-1F, the server system 100 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art.

One of ordinary skilled in the art will appreciate that in the server system 100 in FIGS. 1A-1F are for illustration purpose only. The server system 100 may include fewer or various other components and/or combinations are possible as well within the scope of various embodiments.

The above discussion is meant to be illustrative of the principles and various embodiments of the present technology. Numerous variations and modifications will become apparent once the above disclosure is fully appreciated.

Figure 2:
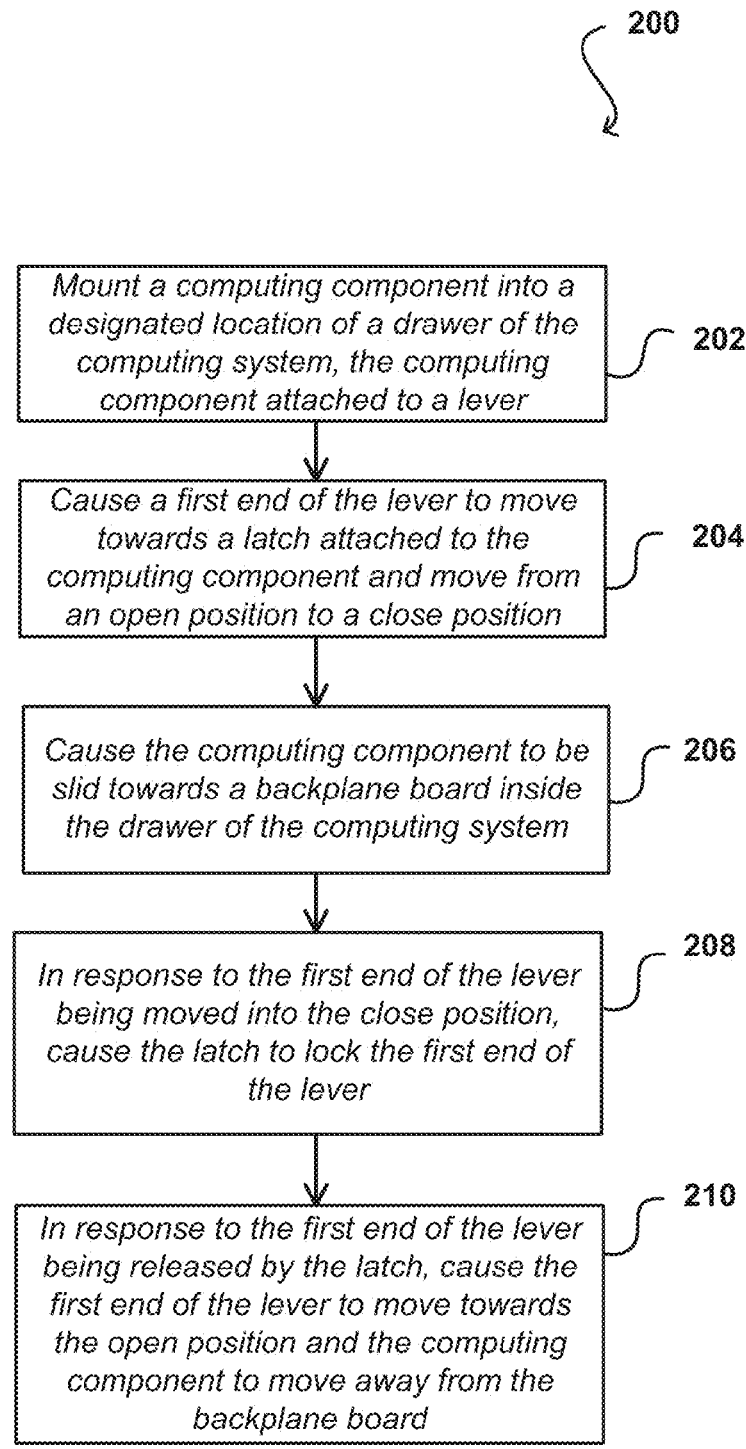
FIG. 2 illustrates an exemplary method of mounting and dismounting a computing component in accordance with implementations of the present technology.

FIG. 2 illustrates an exemplary method of mounting and dismounting a computing component in accordance with implementations of the present technology. It should be understood that the exemplary method 200 is presented solely for illustrative purposes and that in other methods in accordance with the present technology can include additional, fewer, or alternative steps performed in similar or alternative orders, or in parallel. The exemplary method 200 starts with mounting a component of a computing system into a designated location of a drawer of the computing system, at step 202. The computing component is attached to a lever. Various techniques can be used to attach a component to a designated location of a drawer. For example, as illustrated in FIG. 1E, one or more guide pins can be used to facilitate aligning or placing the component into a designated location.

At step 204, a first end of the lever can be moved from an open position to a close position and moved towards a latch. The latch can be attached to the computing component. The movement of the first end of the lever can be performed either manually by an operator or automatically by a machine. In some implementations, the first end of the lever can be locked by the latch when the first end of the lever is under the close position, as illustrated in FIGS. 1C to 1F.

At step 206, the movement of the first end of the lever can cause the component to slide towards a backplane board of the drawer of the computing system. In response to the first end of the lever being moved into the close position, the latch can lock the first end of the lever such that the component is secured to the drawer of the computing system, at step 208. In some implementations, the latch has to be released before the first end of the lever can be moved out of the close position. For example, a force can be placed upon the latch to release the first end of the lever, which is illustrated in FIG. 1C.

At step 210, in response to the first end of the lever being released by the latch, the first end of the lever can be moved towards the open position, which causes the component to be disconnected and slid away from the backplane board. In some embodiments, the lever can be attached to a spring. In response to being released from the latch, the spring can cause the first end of the lever to move to a position such that the first end of the lever can be easily accessed by an operator or a machine.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 3:
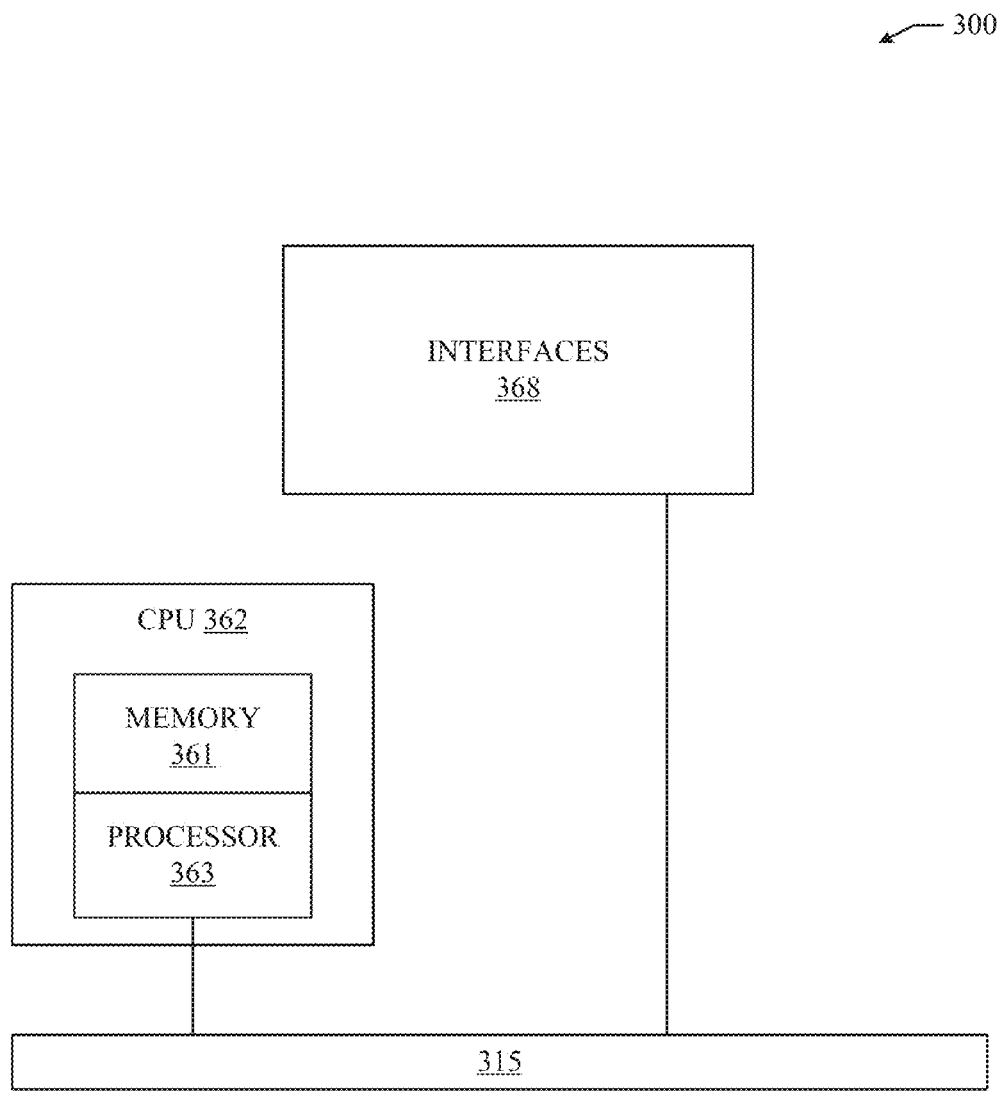
FIG. 3 illustrates an exemplary computing device in accordance with various implementations of the technology.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative embodiment, processor 363 is specially designed hardware for controlling the operations of the computing device 300. In a specific embodiment, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 4A:
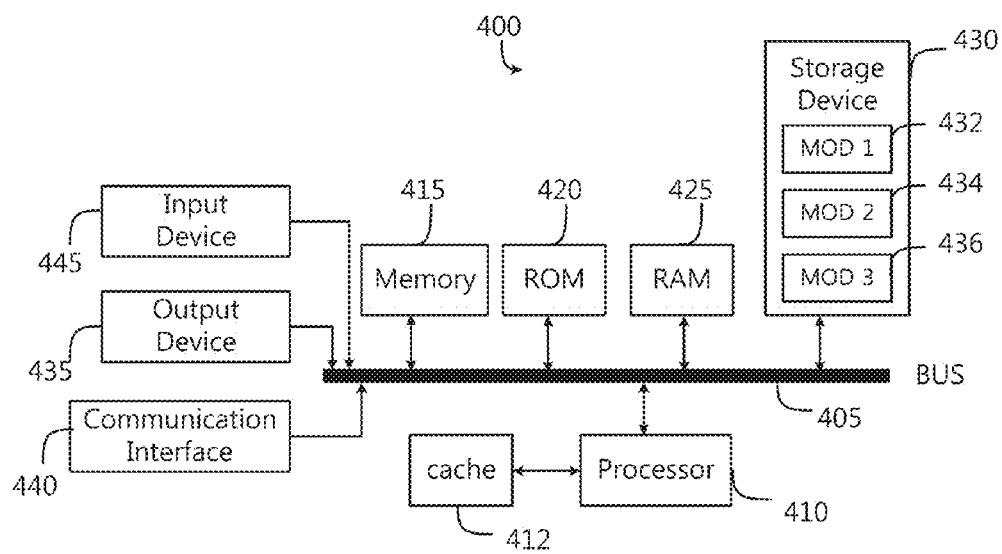
FIGS. 4A and 4B illustrate exemplary systems in accordance with various embodiments of the present technology.
Figure 4B:
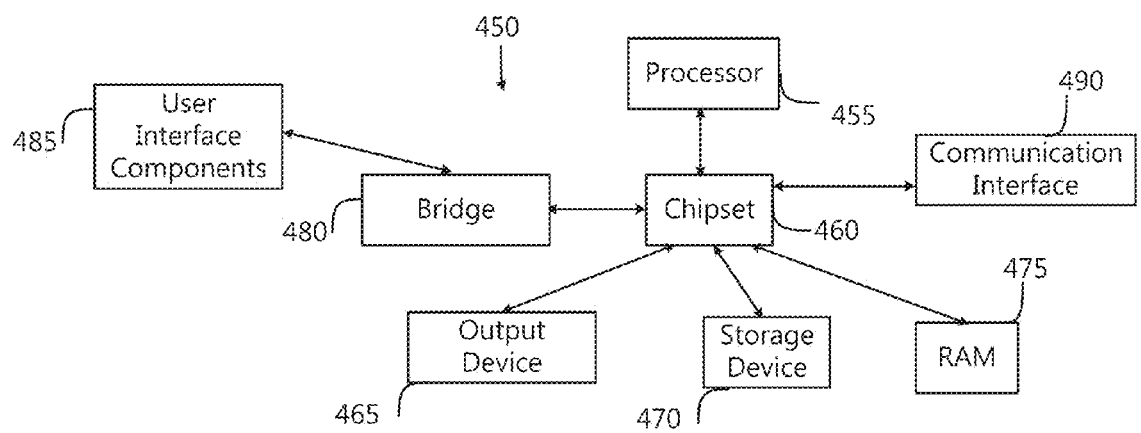

FIG. 4A, and FIG. 4B illustrate example possible systems in accordance with various aspects of the present technology. The more appropriate embodiment will be apparent to those of ordinary skill in the art when practicing the present technology. Persons of ordinary skill in the art will also readily appreciate that other system examples are possible.

FIG. 4A illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 can be available for use as well. The memory 415 can include multiple different types of memory with different performance characteristics. The processor 410 can include any general purpose processor and a hardware module or software module, such as module 432, module 434, and module 436 stored in storage device 430, configured to control the processor 410 as well as a special-purpose processor where software instructions are incorporated into the actual processor design. The processor 410 can essentially be a completely self-contained computing system, containing multiple cores or processors, a bus, memory controller, cache, etc. A multi-core processor can be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here can easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 435 (e.g., a display), and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or RAM 475. Further, the machine can receive inputs from a user via user interface components 485 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide systems and methods for mounting and dismounting a component of a computing device. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present invention can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technology can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A system, comprising:
  a computing component having a top surface, a side surface and a bottom surface;
  a housing comprising a supporting surface, the housing having a slot on the supporting surface, the slot being associated with a location configured to receive and removably connect the computing component to the system; and
  a lever attached to the computing component, the lever attached via a hinge to the side surface of the computing component and extending such that a first end of a lever arm of the lever extends above the top surface of the computing component and a second end of the lever arm extends below the bottom surface of the computing component, wherein the top surface of the computing device is opposite to the bottom surface of the computer device, wherein manipulation with the first end of the lever arm causes the lever arm to interact via the second end of the lever arm with an edge of the slot on the supporting surface to connect the computing component to the system or disconnect the computing component from the system, wherein the computing component includes one or more guide pins, the one or more guide pins configured to facilitate aligning or placing the computing component into the location.

2. The system of claim 1, wherein the computing component is removably connected to the system via a component board.

3. The system of claim 2, wherein the component board is a backplane board, mid-plane board, or a motherboard.

4. The system of claim 1, wherein the computing component is further attached to a latch, the latch configured to lock the first end of the lever when the computing component is connected with the system.

5. The system of claim 1, wherein the first end of the lever has a minimum threshold width for an operator or a machine to apply a force to the first end of the lever.

6. The system of claim 1, wherein the system includes one or more drawers, each of the one or more drawers including at least one component board and a connector, the at least one component board configured to connect to the computing component, the connector configured to connect to the system.

7. The system of claim 6, wherein each of the one or more drawers includes at least one row, each of the at least one row containing one or more locations configured to receive and removably connect the computing component to a corresponding drawer.

8. The system of claim 7, wherein each of the one or more drawers includes a cover, the cover configured to improve a thermal stability of the system.

9. A computing component configured to be removably connected to a computing system having a housing, the housing comprising a supporting surface, the housing having a slot on the supporting surface, the computing component having a top surface, a side surface and a bottom surface, comprising:

a lever, the lever attached to the side surface of the computing component via a hinge and extending such that a first end of a lever arm of the lever extends above the top surface of the computing component and a second end of the lever arm extends below the bottom surface of the computing component, wherein the top surface of the computing device is opposite to the bottom surface of the computer device, wherein manipulation with the first end of the lever arm causes the lever arm to interact via the second end of the lever arm with an edge of the slot on the supporting surface of the computing system to connect the computing component to the computing system or disconnect the computing component from the computing system, wherein the computing component includes one or more guide pins, the one or more guide pins configured to facilitate aligning or placing the computing component into a location of the computing system, the location configured to receive and removably connect the computing component to the computing system.

10. The computing component of claim 9, wherein the computing component is removably connected to the system via a component board.

11. The computing component of claim 10, wherein the component board is a backplane board, mid-plane board, or a motherboard.

12. The computing component of claim 9, further comprising a latch, the latch configured to lock the first end of the lever when the computing component is connected with the computing system.

13. The computing component of claim 9, wherein the first end of the lever has a minimum threshold width for an operator or a machine to apply a force to the first end of the lever.

14. The computing component of claim 9, wherein the computing system includes one or more drawers, each of the one or more drawers including at least one component board and a connector, the at least one component board configured to connect to the computing component, the connector configured to connect to the system.

15. The computing component of claim 14, wherein each of the one or more drawers includes at least one row, each of the at least one row containing one or more locations configured to receive and removably connect the computing component to a corresponding drawer.

* * * * *